(No Model.)
J. P. LAVIGNE.
MICROMETER GAGE.
No. 510,688. Patented Dec. 12, 1893.
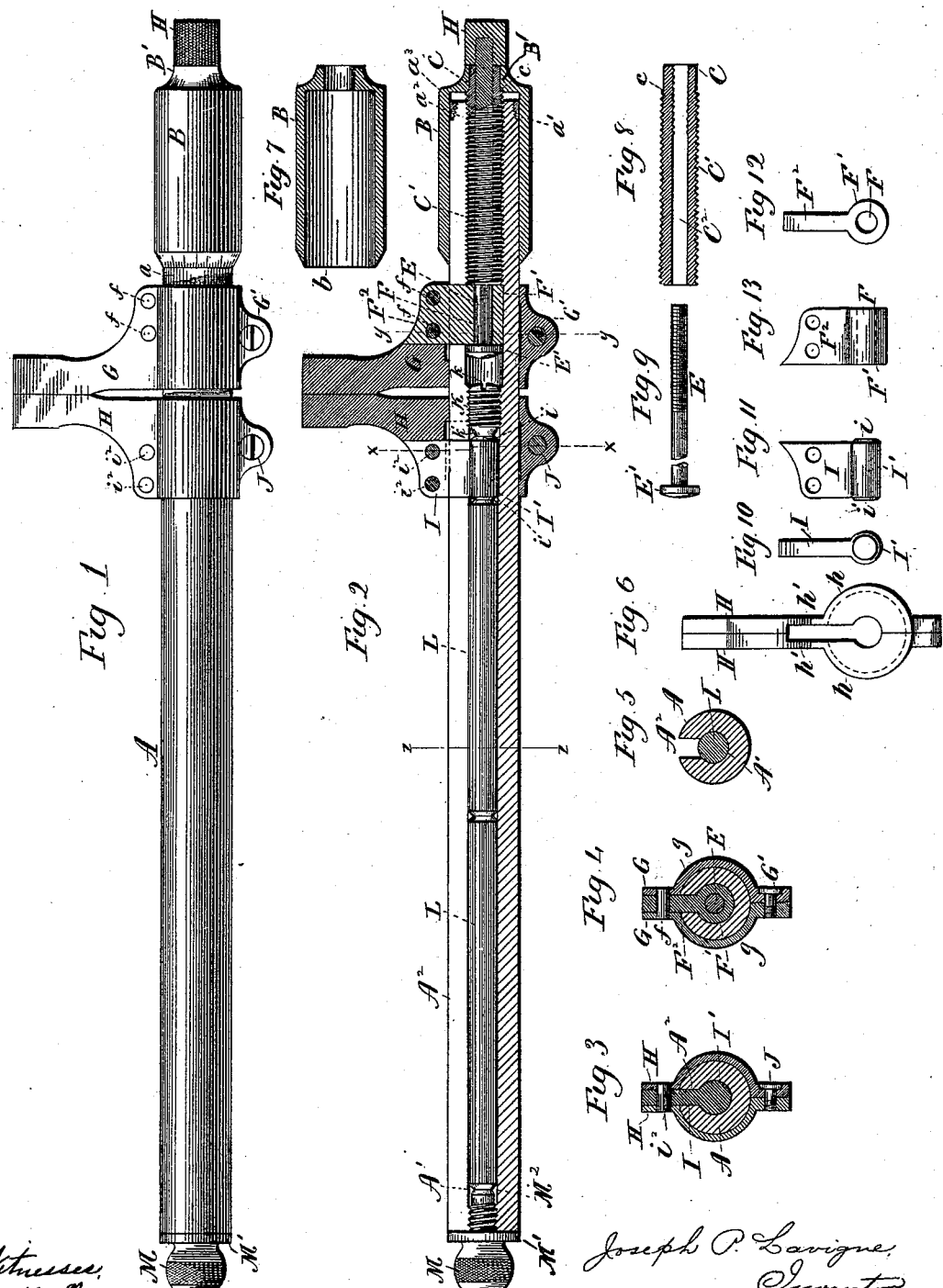

UNITED STATES PATENT OFFICE.

JOSEPH P. LAVIGNE, OF NEW HAVEN, CONNECTICUT.

MICROMETER-GAGE.

SPECIFICATION forming part of Letters Patent No. 510,688, dated December 12, 1893.

Application filed January 7, 1893. Serial No. 457,654. (No model.)

*To all whom it may concern:*

Be it known that I, JOSEPH P. LAVIGNE, of New Haven, in the county of New Haven and State of Connecticut, have invented new Improvements in Micrometer-Gages; and I do hereby declare the following, when taken in connection with accompanying drawings and the letters of reference marked thereon, to be a full, clear, and exact description of the same, and which said drawings constitute part of this specification, and represent, in—

Figure 1, a view in side elevation of a micrometer gage constructed in accordance with my invention; Fig. 2, a view thereof in vertical longitudinal section; Fig. 3, a view in transverse section on the line $x$—$x$ of Fig. 2; Fig. 4, a similar view on the line $y$—$y$ of the same figure; Fig. 5, a similar view on the line $z$—$z$ of the same figure; Fig. 6, a detached view in end elevation of the normally fixed measuring jaws; Fig. 7, a detached view in longitudinal section of the measuring sleeve; Fig. 8, a similar view of the measuring-screw; Fig. 9, a detached broken view in side elevation of the binding-screw; Fig. 10, a detached view in end elevation of the abutment-block of the normally fixed measuring-jaw; Fig. 11, a similar side view thereof; Fig. 12, a similar end view of the corresponding part of the traveling measuring-jaw; Fig. 13, a similar side view thereof.

My invention relates to an improved micrometer gage, adapted for inside as well as for outside measuring, of the type of instrument in which the measuring of inches is done by a set of movable gages, differentiated in length by inches, and the measuring of fractions of inches by a screw, the object being to produce a simple, convenient and durable instrument, operating with a very high degree of precision, and covering a wide range of measuring work.

With these ends in view, my invention consists in the combination, in a micrometer gage, with the beam thereof, of mechanism applied thereto and located partly within the same for measuring fractions of inches, and two measuring jaws, one of which is connected within the beam with the said mechanism, and adjusted on the beam thereby, the outer ends of the said jaws being constructed and adapted for inside and outside measurements, being thereto made narrow, and carrying in themselves no measuring mechanism.

My invention further consists in the combination with such a device as described, of movable gages, differentiated in length by inches, and applied to the beam of the instrument so as to determine the position of the other jaw thereof thereon in accordance with their relative arrangement.

My invention further consists in certain details of construction and combinations of parts as will be hereinafter described and pointed out in the claims.

As herein shown, the beam of the instrument consists of a long tube A, having a central longitudinal, circular opening A', and a radial longitudinal slot $A^2$, extending throughout its length. One end of the beam has mounted upon it a measuring sleeve B, the inner open end $b$, whereof is beveled, and graduated, the said graduations being read in connection with the graduations $a$ formed on the adjacent portion of the outer surface of the beam. The said sleeve is constructed at its outer end with a hub B', which is driven over the reduced outer end C, of the measuring-screw C', the said sleeve and screw being thereby coupled for rotation together. The reduction of the outer end of the measuring screw as described, provides it with a shoulder $c$, against which the inner end of the hub B' of the sleeve abuts as clearly shown by Fig. 2 of the drawings. The said measuring screw takes into interior screw-threads formed in the adjacent end of the beam, the circular opening A' whereof is at this end of the beam made larger than at its other end. The said screw is provided with a central longitudinal circular opening $C^2$, the outer end of which is threaded to receive the threaded outer end of a binding screw E, the inner end of which passes through the bore F, formed in the tubular lower end F' of the abutment-block or head $F^2$, which is mounted between the two corresponding members or parts G G, of the traveling measuring jaw, which will be fully described later on.

The extreme inner end of the binding-screw E, before mentioned, is provided with a head E', the inner face of which bears against the inner edge of the tubular lower end F' of the abutment-block $F^2$, which is thus held firmly between the inner end of the measuring-screw and the said head of the binding-screw. The tubular lower end F', of the said block, fits closely within the opening A' of the beam, while its shank or body fits closely within the longitudinal slot A² thereof, the said abutment-block being secured to the members G G of the traveling measuring-jaw by means of horizontal pins $ff$.

The threaded outer end of the binding-screw E, projects beyond the reduced portion C, of the measuring-screw, and receives a check-nut H, having a knurled periphery, and operating to couple the measuring-screw and the binding-screw together, so that they will invariably rotate in unison.

Under the construction just described, it will be apparent that when the measuring sleeve is turned, the traveling, measuring jaw will be caused to slide back and forth on the beam. The end of the beam inclosed within the measuring-screw is tapered and threaded, as at $a'$, and longitudinally slit as at $a^2$, (Fig. 2) and receives an internally threaded adjusting-nut $a^3$, correspondingly threaded and tapered, and provided for compensating for wear between the beam and measuring screw in case such wear occurs, by drawing the beam onto the screw, by springing its said tapered end a little. I do not, however, claim as new, the use of the adjusting-nut $a^3$ for the purpose.

The traveling jaw before mentioned, is composed of two corresponding members G G, correspondingly bent outward, as at $g\ g$, to adapt them to embrace the beam upon which they are held by the pins $f$, before mentioned, and by a clamping-screw G', uniting their lower ends. The outer ends of the said parts or members G G, are made very narrow, and constructed with straight outer, as well as straight inner faces, both of which are employed.

The normally fixed measuring jaw of the instrument is composed of two corresponding parts or members H H, which correspond to the members G G, of the other jaw, being bent outwardly at their lower ends as at $h\ h$, to adapt them to embrace the beam, and having their inner faces correspondingly recessed as at $h'\ h'$, to receive an abutment-block comprising a shank I, which passes through the longitudinal slot A² of the beam, and the cylindrical lower portion I', which fits within the bore A' of the beam. The respective ends of said cylindrical lower portion of this abutment-block, have raised bearing-faces $i\ i'$. This block is secured between the members H H of the normally fixed measuring jaw, by means of horizontal pins $i^2\ i^2$. A clamping-screw J, passing through the lower ends of the members H H, is employed to clamp the same firmly upon the beam, when the jaw of which they form a part has been set in right position thereon. An adjusting-screw or block K, located within the beam, and having its outer end slotted as at $k$, to receive a screw-driver, and its opposite end made with a bearing-face $k'$, determines the movement of the normally fixed jaw toward its companion traveling jaw, being thereto engaged by the raised bearing-face $i$, of the abutment-block of the normally fixed jaw. A series of cylindrical interchangeable plugs or gages L L, differentiated by inches, is located in the bore A, of the beam, at the end thereof opposite the measuring mechanism, and held therein by a retaining-plug M, having a circular shoulder M', and constructed with a reduced bearing-face M². It has been said that the plugs or gages L L are differentiated by inches, by which it is meant that their variations in length are all based upon the inch; thus a micrometer constructed in accordance with my invention may be furnished with six plugs or gages running from one inch to six inches in length, and these will be used interchangeably in the instrument according to the character of the work to be done. As shown in the drawings, only two of these plugs are represented, but they will serve to illustrate the rest.

As shown in Fig. 2 of the drawings, the instrument is set for measuring only within the range of an inch and fractions thereof. For this adjustment the plugs are located on the outside of the said jaw.

If it is desired to use the device in measuring within three inches let us say, and the fractions thereof, the two inch plug will be interposed between the adjusting-plug K and the cylindrical portion $i'$ of the abutment-block of the normally fixed measuring-jaw, which will be held against outward displacement by plugs located within the beam, and abutted against the outer end of the said tubular portion of the said block.

It will be understood, of course, that when it is desired to set the instrument for measuring different objects varying largely in size, the plugs and normally fixed measuring jaw will be re-arranged in accordance with the character of the work in hand, for by removing the retaining-plug, the movable plugs or gages and the fixed jaw may be readily slipped off from, and restored to, the beam.

I wish to call particular attention to the fact that the outer or measuring ends of the measuring jaws are narrowed down, so that when they are brought together they may be inserted into any opening exceeding, let us say, half an inch in measurement, thus adapting the device to be used in inside measuring in all places which will admit the said ends of the jaws. I am enabled to use these jaws for inside measuring, because I measure all the fractions of the inches on the beam. My adaptation of the device for inside measuring, does not interfere with its use in the ordinary way for outside measuring.

I would have it understood that I do not necessarily employ the movable gages, for if it is desired that the device shall measure only within the limits of an inch, they may be dispensed with. Obviously, however, the instrument has a much greater range of usefulness if it is adapted to be set so as to cover the measurement of objects running from one to six inches let us say. I do not limit myself either to any particular arrangement or construction of the interchangeable plugs, so long as they are adapted to be interchanged in the instrument for the purpose of holding the normally fixed measuring jaw in a desired position on the beam. I would therefore have it understood that I do not limit myself to the exact construction herein shown and described, but hold myself at liberty to make such changes and alterations as fairly fall within the spirit and scope of my invention.

I am aware that it is old to adapt the outer ends of the jaws of micrometers for inside and outside measuring, and do not therefore claim that construction broadly.

Having fully described my invention, what I claim as new, and desire to secure by Letters Patent, is—

1. In a micrometer gage, the combination with the beam thereof, of mechanism applied thereto and located partly within the same for measuring fractions of inches, and two measuring jaws, one of which is connected within the beam with the said mechanism, and adjusted on the beam thereby, the outer ends of the said jaws being constructed and adapted for inside and outside measurements, being thereto made narrow and carrying in themselves no measuring mechanism, substantially as described.

2. In a micrometer gage, the combination with the beam thereof, of a measuring mechanism applied thereto, and located partly within the same two movable jaws one of which is connected within the beam with the said mechanism for actuation thereby, and a series of movable interchangeable gages differentiated by inches, and applied to the beam of the instrument so as to determine the position of the other jaw thereon in accordance with their relative arrangement, the outer ends of the said jaws being made narrow, and having their inner as well as their outer faces made to form measuring surfaces, substantially as described.

3. In a micrometer gage, the combination with the beam thereof, of a measuring screw and a measuring sleeve respectively located on the inside and outside of the said beam and connected together, and two measuring jaws, one of which is connected with the said screw and slides upon the beam, the outer ends of the said jaws being made narrow and faced for inside and outside measurement, substantially as described.

4. In a micrometer gage, the combination with the beam thereof, of a measuring-screw and a measuring-sleeve respectively located on the inside and outside of the said beam and connected together, two measuring jaws arranged to slide on the beam, and one of them being connected with the said screw, and a series of movable gages differentiated by inches applied to the beam, and coacting with the other measuring jaw to determine the position thereof on the beam according to their arrangement, substantially as described.

5. In a micrometer gage, the combination with the beam thereof, of two jaws, one of which is movable thereon, and both of them having their inner as well as their outer faces made to form measuring surfaces, a measuring-screw located within the beam, a measuring-sleeve fitting over the same, and connected with the measuring-screw so as to rotate therewith, and a coupling-screw extending through the measuring-screw and through a block extending into the beam and connected with the movable measuring-jaw, substantially as described.

6. In a micrometer gage, the combination with a hollow slotted beam, of two jaws, one of which is movable thereon, said movable jaw being constructed with a block extending through the slot of the beam into the inside thereof, a measuring-sleeve mounted upon the beam, a measuring-screw located within the beam and connected at its outer end with the said sleeve, and having a central transverse opening, a coupling-screw provided at its inner end with a head, and at its outer end with a check-nut, and extending through the inner portion of the said block and through the said screw, and connecting the said movable jaw with the screw and sleeve, which rotate together, substantially as set forth.

In testimony whereof I have signed this specification in the presence of two subscribing witnesses.

JOSEPH P. LAVIGNE.

Witnesses:
GEORGE D. SEYMOUR,
FRED C. EARLE.